Sept. 18, 1951     H. J. NOLTE     2,568,460
METHOD OF FABRICATING SEALED ENVELOPES
Filed Dec. 24, 1948     2 Sheets—Sheet 1
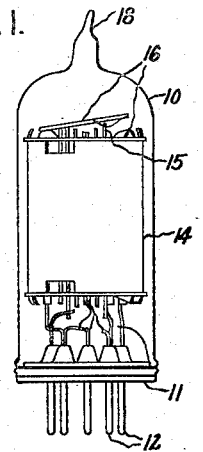
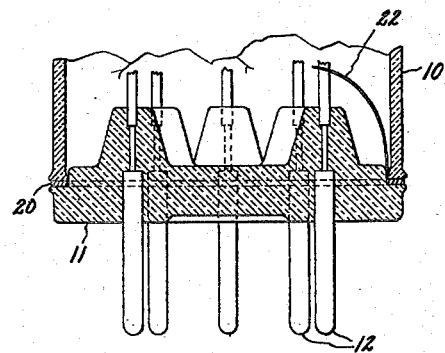
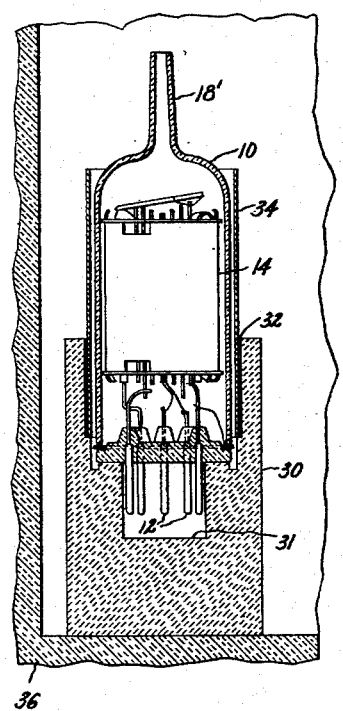
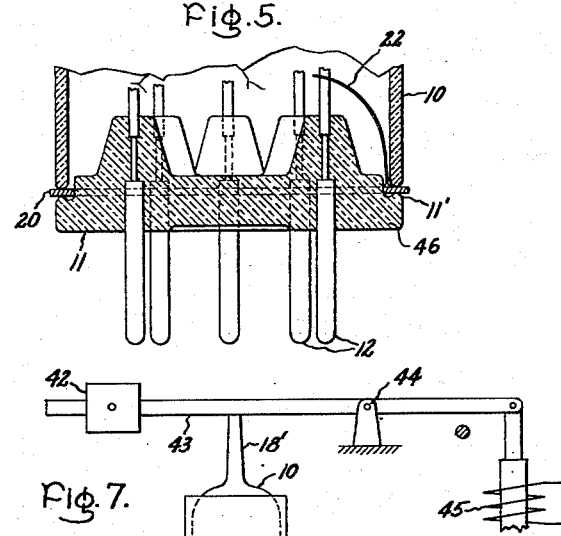
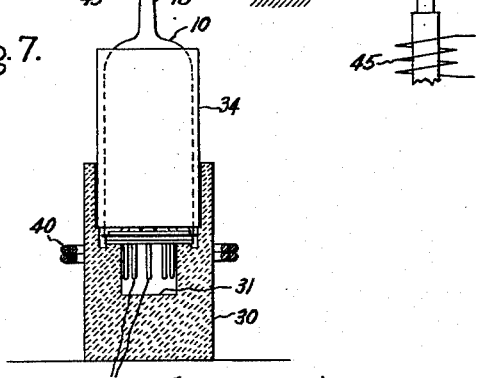
Inventor:
Henry J. Nolte,
by Harry R. Mayers
His Attorney.

Patented Sept. 18, 1951

2,568,460

UNITED STATES PATENT OFFICE 2,568,460

METHOD OF FABRICATING SEALED ENVELOPES

Henry J. Nolte, Schenectady, N. Y., assignor to General Electric Company, a corporation of New York Application December 24, 1948, Serial No. 67,236

1 Claim. (Cl. 49—81)

The present invention relates to an improved method of fabricating sealed envelopes, particularly the envelopes of electric discharge devices.

It has heretofore been proposed to fabricate the envelopes of electronic vacuum tubes and the like by inductive heating of an assembly comprising glass members separated by a metal ring adapted to develop localized heating sufficient to fuse and thus to join the glass parts.

The present invention is concerned with an improvement of this method, particularly in regard to realizing more effective control of the fusion process and the condition of the envelope after such process is completed. More specifically, it has been found that by including in the ring sealing process certain novel provisions for limiting and selectively localizing the heating of a glass part constituting the tube base, a tube structure which is extremely favorable from the standpoint of strength and shock-resistance can be realized.

In general, this involves the creation of an assembly of tube bulb, glass closure member and interposed metal ring which limits the ring to essentially line contact with the closure member. Under these conditions, the fusion of glass produced by heating the ring is effectively confined to a desired region of the closure member, with resultant complete control of the effect of the heat on the closure member's structure and strain pattern.

Steps relating to the production and maintenance of a favorable strain condition in the tube structure also constitute an important aspect of the invention in its principal application.

The invention will be more fully understood by reference to the following description.

Figure 3:
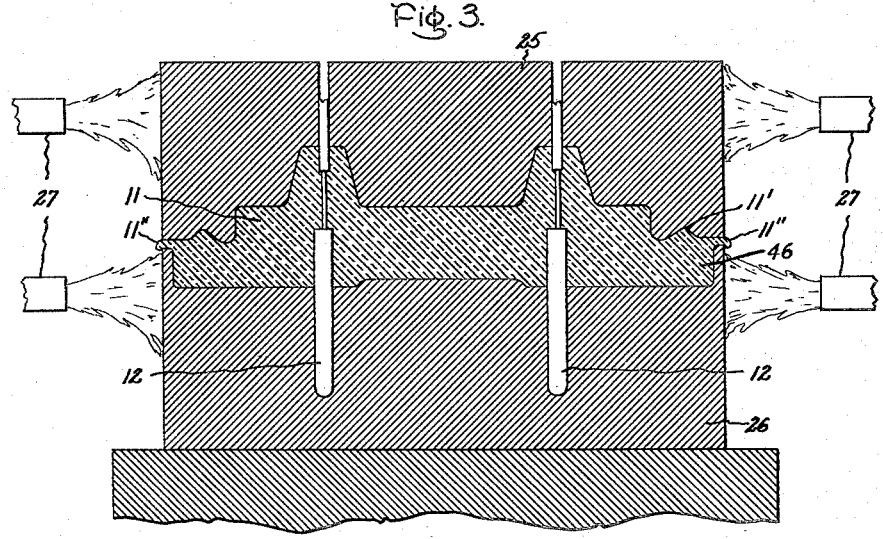
Figure 4:
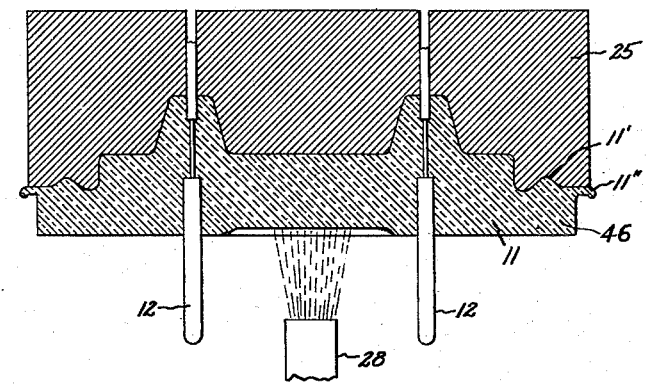
Figure 8:
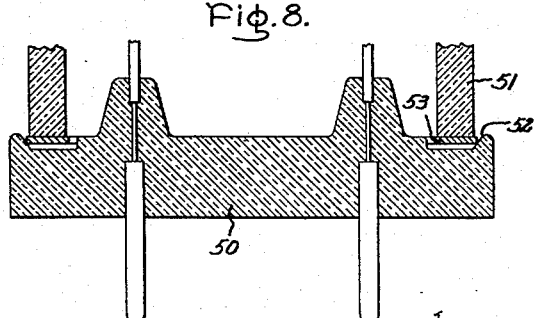

In the drawings, Fig. 1 is a front elevation of a miniature vacuum tube of a type to which my invention may suitably be applied; Fig. 2 is an enlarged fragmentary view in section of a portion of the base structure of the tube of Fig. 1; Figs. 3 and 4 are sectional views indicating successive steps in forming the tube closure member illustrated in Fig. 2; Fig. 5 is an enlarged sectional view showing the assembly of certain of the tube parts prior to the sealing of such parts; Figs. 6 and 7 illustrate successive steps in the sealing operation, and Fig. 8 is an enlarged sectional view corresponding to Fig. 5 and serving to illustrate an alternative embodiment of the invention.

An important use of my invention is in connection with the fabrication of miniature vacuum tubes of the type shown in Fig. 1. In this figure is illustrated a composite envelope comprising a glass container or bulb 10 having its lower end closed by a glass closure member 11 through which are sealed a number of metal lead-in conductors 12. The closure member, sometimes refered to as the tube "stem," is in the form of a flat glass disk preferably constituted of a glass of low conductivity, for example, a lead glass having a softening point of 630° C. The bulb 10 is preferably constituted of lime glass, one suitable glass having a softening point of about 690° C.

Within the envelope there is provided an assembly of discharge electrodes supported upon the inner extremities of the lead-in conductors 12. This assembly may comprise any desired electrode combination and, as shown, includes a cylindrical metal anode 14 within which various other electrodes, including a cathode and one or more grids (not shown), are enclosed. Support rods 15 and various interconnecting elements 16 are shown projecting beyond the end of the anode member. The upper end of the envelope 10 is provided with a seal-off tip 18.

Fig. 2 illustrates in greater detail the structure of the lower end of the tube, including particularly the structure of the closure member 11. As appears in this figure, the closure member and the main envelope 10 are hermetically joined by a glass-sealing metal part 20 sealed between them. This metal part, which is in the form of a ring, is constituted of a suitable glass-sealing alloy and may, for example, consist of an alloy of 28% chromium and 72% iron punched from 10 mil stock. Of course, other glass-sealing metals may be used. The ring 20 is "grounded" by means of a fine wire 22 which is joined to the inner edge of the ring and connects it to one of the lead-in conductors 12. The wire 22 should be extremely fine, for example, .005 inch in thickness, and of insufficient stiffness and strength to support the ring 20 or otherwise materially to effect its position during the process of tube fabrication.

In order to assure high strength and low loss in fabrication, it is highly desirable that the glass comprising the member 11 should be in both radial and tangential compression in all the surface elements of the member, this being a condition which can be shown to produce maximum strength and minimum liability of cracking. The present invention is concerned with a procedure for establishing such favorable strain pattern and more particularly with a method of tube fabrication which permits such a strain pattern, once established, to be maintained throughout the final steps of tube assembly.

To explain the procedure by which compressive strain may be introduced into the structure of the closure member 11, it is necessary to refer briefly to the steps by which the closure member as an independent entity is produced.

One of such steps is shown in Fig. 3 which represents the pressure molding of the lead-in conductors 12 into a mass of fused glass 11, which, while in molten condition, is compressed into the cavities of metal mold parts 25 and 26 adapted to form the closure member into the desired shape having a peripheral portion 46 of less thickness than the body of the closure member as is shown in Fig. 3. Heating torches 27 play upon the mold assembly in order to maintain the glass in the desired fused condition during the molding process.

From the standpoint of the present invention, an important feature of the molding procedure is the production on the upper surface of the peripheral portion 46 of the closure element 11 of a raised circular bead 11' which extends circumferentially around the closure member in a region quite near its outer edge, and the function of which will be described at a later point. A small fillet of excess glass 11'' is permitted to be extruded between the opposing lips of the respective mold parts.

After completion of the molding step illustrated in Fig. 3, one of the mold parts, for example, the part 26, is withdrawn to permit the closure member 11 to solidify and cool. During the cooling period, compressive strain is introduced into the outer surfaces of the member by causing these surfaces to be cooled quite rapidly in relation to the cooling rate of the inner structure. This can be done in one way as indicated in Fig. 4 by causing a jet of relatively cool air to impinge on the closure element, such a jet being provided, for example, from nozzle 28 appropriately directed toward the center of the element.

With a condition of compressive strain as produced by the procedure just specified, the closure member will be found to have maximum strength in the sense that pressure applied laterally to the lead-in wires will have minimum tendency to produce cracking of the adjacent glass. By contrast, the least favorable strain condition is that in which the glass surfaces are placed in tension, and a relatively unfavorable condition is one in which the glass is free of all stress.

From the standpoint of producing a final tube assembly in which the envelope structure is of maximum strength, it is desirable that the compressive strain pattern produced in the closure member 11 in accordance with the foregoing be not lost during later stages of tube assembly. At the same time, this is a matter which is in conflict with the strain-relieving tendencies of the heating processes ordinarily employed in joining the closure member 11 to the main tube envelope. Thus while it has heretofore been proposed to join such parts by the inductive heating of a metal ring interposed between them, such practice as heretofore attempted has nevertheless resulted in heating the structure of the closure member to a strain-relieving temperature or at least to a temperature at which strain is reduced far below the optimum value.

To avoid this result, in accordance with the present invention means and procedure are employed by which the sealing ring (e. g., the ring 20 of Fig. 2) is confined during the initial stages of tube assembly to essentially line contact with the closure member, whereby heat transfer to the member is sufficiently limited and localized so that heating of the main body of the member to a strain-relieving temperature is effectively prevented.

In accordance with the preferred embodiment of the invention, this result is obtained as indicated in Fig. 5 by assembling the tube parts in approximately their desired final relationship with the ring 20 contacting the closure element 11 only to the extent of resting upon the upper crown of the circular bead 11', this arrangement provided the line contact required for the purposes outlined in the foregoing. The contact between the ring 20 and the main envelope part 10 is not particularly critical and may be either a flat contact or a more restricted contact if the edge of the glass comprising the envelope is rounded as shown in Fig. 5.

To join the parts hermetically after their preliminary assembly in the arrangement shown in Fig. 5, they may be located in a refractory fixture of the character indicated at 30 in Fig. 6. It will be noted that this fixture has a central recess 31 within which the outwardly extending prongs of the lead-in conductors 12 extend and, above this, a larger recess 32 within which the main body of the tube may be accommodated. The assembly further includes a metal cylinder 34 closely surrounding the tube envelope and extending to a point near but not encompassing the lower extension of the tube. At this stage of fabrication, the tube is provided with an exhaust tubulation 18' which subsequently to be connected to an evacuating system and sealed off to provide the seal-off tip 18 shown in Fig. 1.

As an intermediate step in the fabricating procedure, the entire assembly of Fig. 6 is preferably preheated in a suitable furnace indicated diagrammatically by the wall structure 36. After heating to such an extent that all the parts are at a uniform temperature of about 275° C., the entire assembly (including the holding fixture 30) is moved to a fabricating position which may be, for example, the starting position on a multistation tube-making machine (not illustrated). Here the assembly is placed within an induction heating coil 40 which should be located approximately level with, although slightly below, the lower extremity of the tube so as to surround the closure member in good inductive relation with the sealing ring 20 (see Fig. 7). At the same time, the tube parts are subjected to a compressive force which may be supplied, for example, by a weight 42 on the order of 1,000 grams which is carried by a support bar 43 fulcrumed at 44. With this assembly, the sealing ring 20 is heated inductively by energization of the coil 40 for a period on the order of twelve seconds. This step, takes place concurrently with the action of the weight 42, causes the glass of the bulb 10 and of the peripheral portion 46 of the closure member 11 (primarily the bead 11') to become heated to a fusion temperature, thus resulting in mutual sealing of the parts in approximately the condition indicated in Fig. 2. Thereafter, the weight 42 is lifted, for example, by energization of the solenoid 45, and inductive heating is continued for a period of about eight seconds whereupon the sealing process may be considered essentially complete except for the usual post-sealing steps of careful cooling, etc.

By virtue of the extremely limited (e. g., line) contact existing between the metal sealing ring 20 and the crown of the bead 11' provided on the closure member, heating and fusion of the member will be substantially wholly confined to the vicinity of the ring, this being because of the limited opportunity for heat transfer between the ring and the closure member as a whole. Accordingly, the sealing operation may be performed and the desired amount of glass fusion produced without heating the main body of the closure member to anywhere near the level of 450° C. at which all compressive strain would be relieved and the strength of the closure member materially impaired. Thus, while some slight modification of the strain pattern may occur, the invention nevertheless provides a method by which hermetic sealing may be accomplished while preserving a wanted degree of compressive strain in the glass structure surrounding the lead-in conductors 12.

It will be understood, of course, that the invention is not limited in application to tubes of the miniature type. It has, for example, been found capable of further application in sealing a lead-bearing closure member to the extremity of the stem of a cathode ray tube with resulting structure at the stem extremity very much resembling that of Fig. 2.

It will be understood further that the line contact which is to be established in the preliminary assembly between the metal sealing ring and the closure member may be effected by other arrangements than that shown in Fig. 5, although the latter is preferred. An example of an alternative arrangement is shown in Fig. 8 in which the element 50 represents a lead-bearing closure member and the part 51 represents a glass container to which the closure member is to be joined. Here the closure member is provided near its outer periphery with an inwardly inclined surface 52 on which a single edge of a metal sealing ring 53 may bear in essentially line contact. Here again during the initial heating stages of a process such as that illustrated in Fig. 7 the transfer of heat between the ring 53 and the closure member 50 will be so limited because of the restricted contact of these parts that no serious modification of the strain pattern in the closure member will occur.

Further modifications within the scope of the invention will be apparent to those skilled in the art.

What I claim as new and desire to secure by Letters Patent of the United States is:

The method of fabricating an envelope for electric discharge tubes comprising a glass bulb portion open at least at one end and a molded generally flat circular glass closure member of greater thickness than said bulb portion, said method comprising the steps of forming said closure member with a compression strain pattern therein and with a peripheral portion of less thickness than the body of the closure member with a narrow circular bead on the upper surface of said peripheral portion, positioning a metal sealing ring on said bead between the open end of the bulb portion and the closure member, inductively heating said sealing ring to a temperature sufficient to cause fusion thereof with the adjacent glass portions, the heating of the closure member being sufficiently restricted by the small area of contact between said sealing ring and the bead on said closure member to preserve the compressive strain pattern of said closure member.

HENRY J. NOLTE.

REFERENCES CITED

The following references are of record in the file of this patent:

UNITED STATES PATENTS

| Number | Name | Date |
| --- | --- | --- |
| 1,483,461 | Littleton, Jr. | Feb. 12, 1924 |
| 2,048,556 | McArthur | July 21, 1936 |
| 2,125,316 | Ronci | Aug. 2, 1938 |
| 2,296,579 | Seelen | Sept. 22, 1942 |
| 2,318,652 | Wiener | May 11, 1943 |
| 2,359,501 | White | Oct. 3, 1944 |
| 2,386,820 | Spencer | Oct. 16, 1945 |

FOREIGN PATENTS

| Number | Country | Date |
| --- | --- | --- |
| 108,056 | Australia | 1937 |
| 536,858 | Great Britain | May 29, 1941 |